Oct. 19, 1965 J. C. McADAM 3,212,569
HEAT DISSIPATOR FOR ELECTRONIC COMPONENTS
Filed June 26, 1961 2 Sheets-Sheet 1

INVENTOR.
JOHN C. McADAM
BY
Beehler & Shanahan
ATTORNEYS

HEAT DISSIPATOR FOR ELECTRONIC COMPONENTS
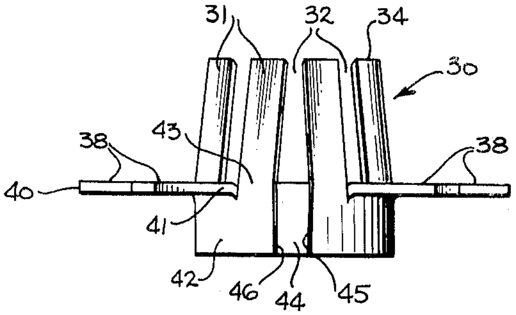
FIG. 4
FIG. 5
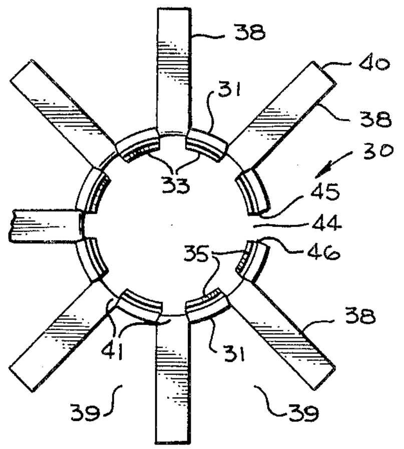
FIG. 9
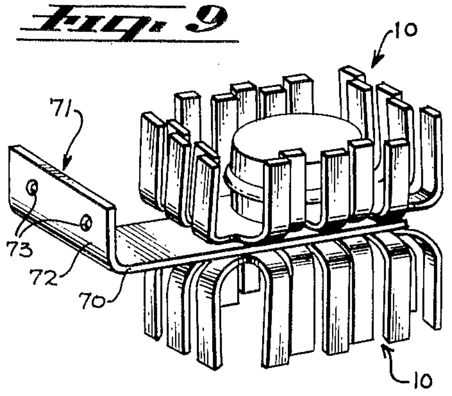
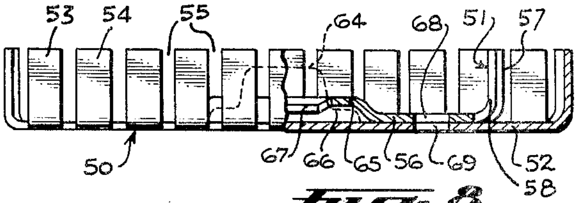
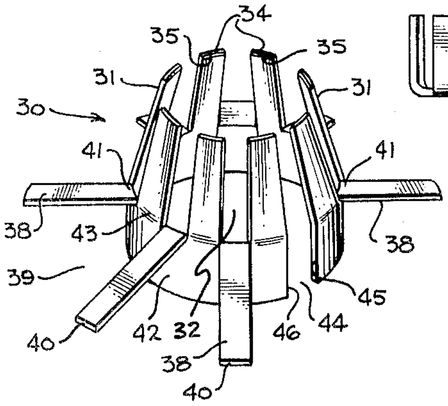
FIG. 8
FIG. 6
INVENTOR.
JOHN C. McADAM
BY
Beehler & Shanahan
ATTORNEYS 3,212,569

HEAT DISSIPATOR FOR ELECTRONIC COMPONENTS

John C. McAdam, Burbank, Calif., assignor, by mesne assignments, to International Electronic Research Corporation, a corporation of California Filed June 26, 1961, Ser. No. 119,587
9 Claims. (Cl. 165—80)

The invention relates to heat transfer means and more especially a heat dissipating shield or jacket for transistors.

Although it is commonly supposed that, unlike the conventional electronic tubes, transistors do not generate an appreciable amount of heat, under actual conditions there is a sufficient amount of heat generated even under ordinary circumstances to require removal by some means or other. Moreover, efficieny of devices of the transistor type is improved by the effective cooling of such electronic components when in use. Special types of transistors used for power amplification generate a considerable amount of heat and if too much heat is permitted to accumulate, it may result in a breaking down of the bond between portions of the transistor material.

Heretofore the trade has attempted to concentrate on different types of dissipators for different types of installations. That is to say, transistors set up in a manner to be cooled by natural circulation of air have prompted employment of a specific type of heat dissipator. On other occasions where forced air is available and can be relied upon, heat dissipators of a somewhat different type have been made more popular. Examples of heat dissipators of the type above made reference to are disclosed in co-pending applications Serial Nos. 71,023, filed November 22, 1960, and 71,098, filed November 22, 1960.

Because of the variety of styles of transistors to suit the different needs, considerable objections have arisen in that an excessive inventory is needed and because it sometimes is not readily possible to locate the particular dissipator needed for each individual application. Further still, many of the transistors heretofore resorted to have been unnecessarily heavy and cumbersome in proportion to the amount of heat successfully dissipated.

It is therefore among the objects of the invention to provide a new and improved heat dissipator especially designed for use with heat generating electronic components such as, for example, transistors, diodes, rectifiers and related semiconductor devices and which is extremely simple in its construction and design but which at the same time is highly effective.

Another object of the invention is to provide a new and improved heat dissipator for use with heat generating electronic components which is versatile to the extent that it can be used with substantially equal effectiveness for natural circulation of air and in the alternative forced circulation of air or in fact for a combination of the two.

Another object of the invention is to provide a new and improved heat dissipator for devices in the nature of transistors which, because of its simple construction and design, generates in the course of manufacture a substantially minimum amount of scrap and for these reasons is one especially inexpensive.

Still another object of the invention is to provide a new and improved heat dissipator for transistors and the like which, because of its design and construction, can be depended upon to create a turbulence in air circulated about the transistor being cooled whether a natural draft is depended upon or a forced draft, thereby to materially improve the effectiveness of the transfer of heat.

With these and other objects in view, the invention consists in the construction, arrangement and combination of the various parts of the device, whereby the objects contemplated are attained, as hereinafter set forth, pointed out in the appended claims and illustrated in the accompanying drawings.

In the drawings:

FIGURE 4 is a side elevational view of a second form of the device.

FIGURE 5 is a plan view of the device shown in FIGURE 4.

FIGURE 6 is a perspective view of the device shown in FIGURES 4 and 5.

FIGURE 8 is a longitudinal sectional view taken on the line 8—8 of FIGURE 7.

FIGURE 9 is a perspective view showing two of the devices mounted in tandem.

Figure 1:
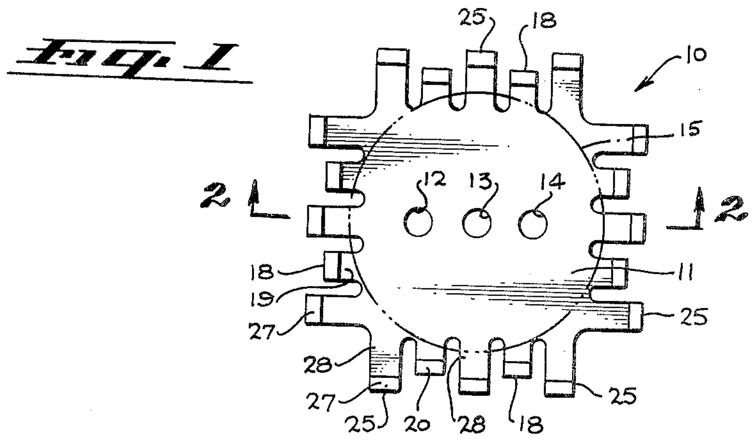
FIGURE 1 is a plan view of one form of the device.
Figure 2:
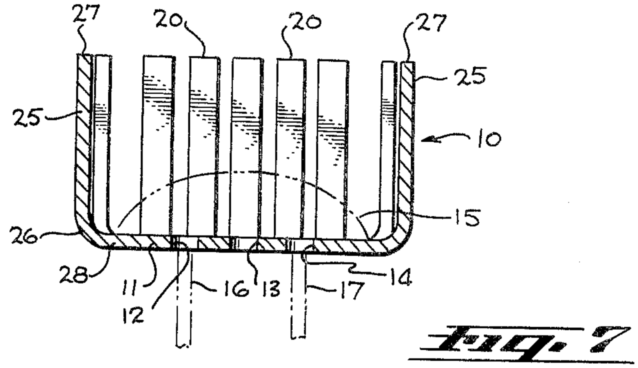
FIGURE 2 is a longitudinal sectional view taken on the line 2—2 of FIGURE 1.
Figure 3:
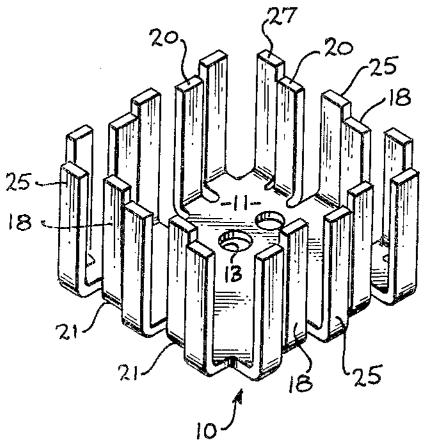
FIGURE 3 is a side perspective view of the device shown in FIGURES 1 and 2.

In an embodiment of the invention chosen for the purpose of illustration there is shown a heat dissipator for transistors comprising a receptacle indicated generally by the reference character 10 which is constructed of sheet metal material having prior to the stamping and forming operation a relatively flat shape. The receptacle in the form of FIGURES 1, 2 and 3, inclusive, is provided with a flat bottom 11 in which are holes 12, 13 and 14 through which leads of a transistor indicated generally by the broken line of FIGURE 2 may be directed, the leads in this instance comprising two leads 16 and 17.

The receptacle in this embodiment is substantially rectangular in its general shape and consists of an inner wall portion comprising a first set of fingers 18. The fingers are substantially rectangular in form and are arranged parallel with respect to each other. The fingers, moreover, are elongated and extend from the flat bottom 11 upwardly and in essence define a space 19 within which the transistor 15 is located. Tops 20 of the fingers 18 extend around an open outer end into which the transistor may be inserted.

The fingers 18, moreover, are in spaced relation defining spaces therebetween which extend throughout the entire height of the fingers from a bottom edge 21 where the fingers join the flat bottom 10 to the tops 20.

A second set of fingers 25 are of substantially the same elongated rectangular form and are joined at bottoms 26 thereof to the flat bottom 11 and extend upwardly terminating in tops 27 which lie in the same plane as the tops 20 of the fingers 18. It will be noted that the bottoms 26 of the fingers 25 comprise a somewhat arcuate junction with the flat bottom 11, there being present a connecting portion 28 which permits the fingers 25 to stand out at locations further removed from the interior of the space 19 than the fingers 18. The fingers 25 occupy portions of the spaces between the fingers 18 along the side wall but are somewhat narrower than the spaces so that there remains space between side edges of the fingers 25 and the next adjacent side edges of the fingers 18. The spacing made reference to is enhanced to a still further degree by the location of the fingers 25 outwardly relative to the fingers 18.

Constructed as shown, the fingers 18 may be considered as defining an inner wall section and the fingers 25 as defining an outer wall section. The fingers are staggered with respect to each other as are also the spaces between them. By reason of this arrangement, any passage of air in and around the fingers is compelled to take a tortuous path. The tortuous path, moreover, tends to generate a degree of turbulence in the air circulating about and within the space 19 and hence a turbulence around the transistor 15. This somewhat turbulent effect is very efficacious in improving the degree of transfer of heat by convection from the transistor. Moreover, by reason of the fact that the transistor is in engagement with the flat bottom 11, there is an important additional transfer of heat by conduction, despite the presence of a thin film of insulating finish on the bottom, as disclosed and described in Patent No. 2,964,688.

Moreover, under circumstances where there is a forced draft of air, the forced flow when passing the fingers 18 and 25 in their staggered relationship creates to a still further degree a necessary and desirable turbulence. This turbulent effect is created whether the flow induced is parallel to the flat bottom or is directed downwardly against the flat bottom or in an oblique direction.

Further still, by reason of the fact that the material comprising the receptacle is a sheet metal material, the fingers can be stamped and bent to the desired form shown as a single die operation. It will be appreciated, therefore, that the heat dissipator thus formed is one which can be quickly and efficiently made in large quantities without the necessity of adhering to close tolerances and without the generation of a great surplus of scrap material. The very nature of the design which accomplishes these expedients also contributes to the forming of the multiplicity of radiating finger surfaces in a relationship which promotes a very high degree of efficiency in the dissipation of heat. Moreover, in the form shown, transistors of various diameters, sizes and styles can be used with the heat dissipator without need for making any material changes in the receptacle, other than perhaps to alter the spacing and number of holes in the flat bottom.

Important also in the dissipation of heat from the dissipator is the transfer of heat by conduction from the dissipator to a chassis or heat sink (not shown) upon which the dissipator may be mounted. The mounting may be individual for each unit or, on occasions the dissipators may be mounted in groups of two or more. A satisfactory mounting for two in back to back in pairs, fastened to a bracket so as to be mounted upon an appropriate support.

In another form of the invention identified in FIGURES 5 and 6, likewise constructed of sheet metal material, there is shown a receptacle indicated generally by the reference character 30. In this form of device there is provided a plurality of fingers 31 spaced one from another, thereby to provide spaces 32 between them. The fingers 31 have a substantially elongated rectangular shape but may be slightly arcuate as indicated by the reference character 33 at the inner face so as to assist in effectively encompassing and gripping a transistor to which the receptacle is attached. Tops or top ends 34 may be bevelled slightly at the inner edges as indicated at 35 to assist in the application of the transistor to the receptacle.

In contrast to the fingers 31 forming a first set of fingers, there is a second set consisting of fingers 38. These fingers have substantially the same length as the fingers 31 and are located respectively in the spaces 32 between the fingers 31. In the instance of the second set of fingers 38, these fingers extend radially outwardly and form spaces 39 therebetween, the breadth of which is wider near outer ends 40 than at bases 41. The fingers 38 are joined to a wall section 42 which, in the embodiment shown, is imperforate. Fingers 31 are also joined at spaces 43 thereof to the same wall section 42. In the chosen embodiment where the receptacle 30 is formed of a single piece of sheet metal, the fingers are die cut from a simple rectangular piece without generating any scrap and the piece during the same operation deformed to the extent of spreading the fingers 38 radially outwardly whereafter the wall section 42 is formed into a substantially annular shape but leaving an opening 44, edges 45 and 46 of which are not brought into engagement with each other in order to maintain to the greatest degree possible an open effect.

Formed as shown under conditions where the material of the receptacle 30 is of a springy character, the completed receptacle is also somewhat resilient and springy, permitting very easy mounting upon the transistor.

As shown, the fingers 31, forming a first set in close proximity to any transistor which might be mounted thereon, comprise a primary heat dissipating area whereas the fingers 38 located more remote from the transistor but nevertheless in thermal contact with it, form a secondary heat dissipating area. The combined first and second sets of fingers perform a multiple purpose in that they force air circulating in and around the receptacle to follow a somewhat turbulent path, especially within the interior of the receptacle and also form a means of carrying away heat by conduction from the areas of engagement of the fingers 31 with a transistor through the fingers 31, the wall section 42 and also the fingers 38. The fingers, being flat walled elements, form an effective means of dissipation.

The fingers in both forms of the device are especially instrumental in generating a turbulent condition in the air as air flows between, in and around the fingers. This condition is present to a marked degree in the form of invention of FIGURES 1, 2 and 3 and results in a rapid and effective removal of heat under conditions both of natural circulation and induced circulation. Each finger stands out individually to easily contact the air on all surfaces so that the transfer of heat is one of high efficiency.

Figure 7:
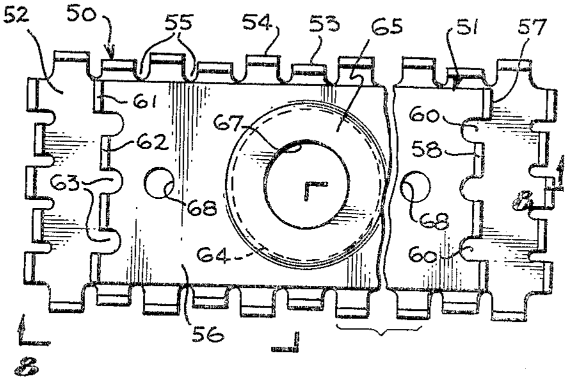
FIGURE 7 is a plan view of another form of the device.

In the form of device shown in FIGURES 7 and 8, there is provided an exterior container indicated generally by the reference character 50 and an interior container indicated generally by the reference character 51, the interior container being nested within the exterior container.

The exterior container includes an exterior bottom 52 around the perimeter of which is a double set of fingers comprising inner fingers 53 and outer fingers 54. Lateral spaces 55 are provided between adjacent inner and outer fingers but the inner fingers are also spaced inwardly with respect to the outer fingers so that they are arranged in a mutually staggered relationship around the perimeter.

The interior container 51 is provided with an interior bottom 56 which rests upon the inside upper surface of the exterior bottom 52. Although it is contemplated that the periphery of the interior bottom 56 may be provided with fingers, in the embodiment shown where the interior container is rectangular in shape, rows of fingers are provided only at the short opposite ends. At the right-hand end, as viewed in FIGURES 7 and 8, outer fingers 57 alternate with inner fingers 58 in staggered relationship, there being provided spaces 60 between respectively adjacent inner and outer fingers. Furthermore, the inner fingers are spaced inwardly with respect to the outer fingers to assure ample and staggered relationship therebetween. Moreover, the row of fingers consisting of the inner and outer fingers 57 and 58 is spaced inwardly from the adjacent row of perimetral fingers of the exterior container.

The same relationship just described holds true at the opposite end where outer fingers 61 are spaced laterally from inner fingers 62 and are also on a line spaced outwardly with respect to the line of the inner fingers. Spaces 63 between immediately adjacent fingers, like the spaces 60, are, in the embodiment chosen for the purpose of illustration, somewhat greater in breadth than the spaces 55 which separate the fingers 53 and 54 of the exterior container.

The interior bottom 56 in the chosen embodiment has a raised portion 65 providing a space 66 between the raised portion and the mid-area of the exterior bottom 52. An opening 67 is located substantially at the mid-area, radially inwardly with respect to the space 66 and provides a communication between the space 66 and the general inside space within the interior container 51. Holes 68 extending through the interior bottom 56 are in alignment with holes 69 in the exterior bottom 52 when the exterior and interior containers are assembled.

In use it has been found advantageous to mount the electronic component which may, for example, be a transistor 64 upon the inside face of the exterior bottom 52 with a rim of the component extending outwardly and an upper cap or body portion extending upwardly. Thereafter the interior container is applied so that the opening 67 surrounds the mid-portion of the component and so that further the raised portion 65 of the interior bottom 56 overlies any rim, lug or protrusion which may be provided on the component. A suitable fastening device (not shown) such as a screw or rivet can then be applied through the holes 68 and 69, thereby serving a double purpose, namely, that of aligning and positioning the interior container within the exterior container and also that of fastening the interior container and the component in position. The fastening is preferably snug and secure, forcing the metal bottoms of the containers into engagement with each other and also snugly into engagement with the rim of the component, thereby to provide a dependable metal to metal contact for the conduction of heat generated in the component to the containers. As will be noted the component is spaced a substantial distance inwardly from the perimeters of both containers. Moreover, the fingers at the perimeter of both containers are staggered not only with relation to each other but also with relation to the fingers of adjacent perimeters. This staggered relationship spaced as shown provides a very pronounced turbulent effect when air moves around the component whether it chances to be natural circulation or a forced draft. By thus compelling the air to move in and around all surfaces of the fingers with a material degree of agitation, heat which is passed to the containers and the fingers either by way of conduction, convection or radiation has an ample opportunity to be dissipated, thereby to cool the appropriate component to a dependable degree.

Further still, by providing a double bottom by imposition of the interior bottom on top of the exterior bottom, a slightly greater mass is provided at the area where conduction of heat initially takes place from the component to the heat dissipating containers, thereby further improving the ability of the device to conduct heat away.

In the embodiment illustrated in FIGURE 9, receptacles such, for example, as the receptacles 10, are mounted together back to back and additionally are secured to a column 70 of a bracket 71, there being provided a foot 72 on the bracket in which are holes 73 to assist in mounting the bracket upright upon some suitable chassis or heat sink (not shown). By mounting a multiple number of receptacles in this fashion, as suggested by the tandem arrangement on a single bracket, the multiple number of fingers are placed in a position such that they assist each other in compelling a turbulent circulation of air in and around such components as may be mounted within the receptacles. In this fashion a larger number of components can be compacted into a small space than might otherwise be possible while at the same time actually improving the ability of the receptacles to dissipate the increased amount of heat which might be generated under those circumstances. Here again the heat is dissipated not only by way of conduction through the bracket but also by way of radiation and convection as air moves in, around and between the perimetral finger wall construction which has been described in considerable detail.

While the invention has herein been shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices.

Having described the invention, what is claimed as new in support of Letters Patent is:

1. A heat dissipator for an electronic component comprising a base having a relatively central area of support for said component, a composite wall structure around said relatively central area forming with said relatively central area an enclosure for said component, said composite wall comprising individual fingers each having one end free and the other end attached to the base at an angle transverse with respect to said relatively central area, each said finger being spaced from each adjacent finger, some of said fingers being spaced closer to said relatively central area than others of said fingers.

2. A heat dissipator for an electronic component comprising a base having a relatively central area of support for said component, a first line of fingers extending around the perimeter of said relatively central area, each finger having one end free and the other end attached to the base at said perimeter, said fingers being bent at an angle transverse relative to the base and extending in the form of a first enclosure for said relatively central area, a second line of fingers adjacent said perimeter, each finger of said second line having one end free and the other end attached to the base, said fingers being bent at an angle transverse relative to the base and forming a second enclosure or said relatively central area, said second enclosure being smaller than said first enclosure and located within said first enclosure, the fingers of one of said lines being spaced from adjacent fingers of the other of said lines and fingers in each line being spaced from adjacent fingers in the same line, said lines of fingers thereby forming a composite wall of individual fingers around the component.

3. A heat dissipator for mounting an electronic component upon a chassis, said dissipator comprising a base having a relatively central supporting portion for said component and a mounting portion for mounting said dissipator on the chassis, a composite wall structure around the perimeter of said supporting portion forming with said supporting portion an enclosure for said component, said composite wall structure comprising individual fingers each having one end free and the other end attached to the base at an angle transverse with respect to said supporting portion, each said finger being spaced from each adjacent finger, some of said fingers being spaced closer to said supporting portion than others of said fingers.

4. A heat dissipator for an electronic component comprising a base having a supporting portion for said component, a composite wall structure around said supporting portion forming with the supporting portion an enclosure for said component, said composite wall comprising individual fingers each having one end free and the other end attached to the base at an angle transverse with respect to said supporting portion, each said finger being spaced both laterally from adjacent fingers and at a distance from the supporting portion different from the distance between the supporting portion and adjacent fingers.

5. A heat dissipator for an electronic component comprising a base having a supporting portion for said component, a composite wall structure around said supporting portion forming with the supporting portion an enclosure for said component, said composite wall structure comprising individual fingers each having one end free and the other end attached to the base at an angle transverse with respect to said supporting portion, said fingers being flat sided fingers, each of said fingers having edges thereof spaced from edges of adjacent fingers, some of said fingers being spaced closer to said supporting portion than others of said fingers, flat sides of some of said fingers having positions in angular relationship to flat sides of others of said fingers.

6. A heat dissipator for mounting an electronic component comprising first and second sections, each section comprising a base having a supporting portion, a wall structure around said supporting portion forming with said supporting portion an enclosure, said wall structure comprising individual fingers each having one end attached to the base at an angle transverse with respect to the supporting portion and each finger being spaced from each adjacent finger, one of said sections being smaller than the other and being nested within the other with one said supporting portion adjacent to and joined to the other, at least one of said supporting portions serving as a support for the component, the fingers of the smaller of said sections being spaced inwardly from the fingers of the larger of said sections whereby to provide a composite wall structure around the supporting portions.

7. A heat dissipator for mounting an electronic component comprising first and second sections, each section comprising a base having a supporting portion, a wall structure around said supporting portion forming with said supporting portion an enclosure, said wall structure comprising individual fingers each having one end attached to the base at an angle transverse with respect to the supporting portion and each finger being spaced from each adjacent finger, one of said sections being smaller than the other and being nested within the other with one said supporting portion adjacent to and joined to the other, said supporting portions being in positions opposite each other and spaced one from the other whereby to mount the component therebetween, the fingers of the smaller of said sections being spaced inwardly from the fingers of the larger of said sections whereby to provide a composite wall structure around the component.

8. A heat dissipator for mounting an electronic component comprising first and second sections, each section comprising a base having a supporting portion, a wall structure around said supporting portion forming with said supporting portion an enclosure, said wall structure comprising individual fingers each having one end attached to the base at an angle transverse with respect to the supporting portion and each finger being spaced from each adjacent finger, one of said sections being smaller than the other and being nested within the other with one said supporting portion adjacent to and joined to the other, one of said sections having an opening therein for a central portion of said component, said supporting portions being in position opposite each other and spaced one from another whereby to retain an outer portion of the component therebetween, the fingers of the smaller of said sections being spaced inwardly from the fingers of the larger of said sections whereby to provide a composite wall structure around said component.

9. A heat dissipator for electronic components comprising first and second sections, each section comprising a base having a supporting portion for a component on one side, a mounting portion on the other side and a wall structure around the supporting portion, said wall structure comprising individual fingers each having one end attached to the base at an angle transverse with respect to said supporting portion and each finger being spaced from each adjacent finger, some of said fingers being located closer to said supporting portion than others of said fingers, and a bracket for mounting said sections, said mounting portions being secured in back to back position on said bracket whereby said bracket is adapted to carry a plurality of the sections and components supported therein.

References Cited by the Examiner

UNITED STATES PATENTS

| | | | |
|---|---|---|---|
| 2,140,442 | 12/38 | Clark | 174—35.5 X |
| 2,267,128 | 12/41 | Mouromtseff et al. | 257—263 X |
| 2,703,226 | 3/55 | Simpelaar | 165—179 X |
| 2,935,666 | 5/60 | Van Namen | 317—234 |
| 2,964,688 | 12/60 | McAdam | 317—234 |
| 3,023,264 | 2/62 | Allison | 257—263 X |

FOREIGN PATENTS

| | | |
|---|---|---|
| 596,871 | 5/34 | Germany. |
| 579,610 | 8/46 | Great Britain. |
| 768,103 | 2/57 | Great Britain. |
| 868,090 | 5/61 | Great Britain. |

CHARLES SUKALO, *Primary Examiner.*

EUGENE F. BLANCHARD, *Examiner.*